United States Patent [19]

Factor et al.

[11] Patent Number: 5,466,491
[45] Date of Patent: Nov. 14, 1995

[54] RADIATION CURABLE SILICON CONTAINING POLYARCYLATE HARDCOAT COMPOSITIONS, METHOD FOR MAKING, AND USE

[75] Inventors: Arnold Factor; Larry N. Lewis, both of Scotia, N.Y.

[73] Assignee: General Electric Company, Schenectady, N.Y.

[21] Appl. No.: 304,300

[22] Filed: Sep. 12, 1994

[51] Int. Cl.$^6$ .................................. B05D 3/06; B32B 9/04
[52] U.S. Cl. .......................... 427/515; 427/512; 428/412; 428/447; 524/806
[58] Field of Search .................................. 428/412, 447; 427/515, 512; 526/258, 265, 293, 294, 295, 311, 338, 340.3; 524/806, 99, 100, 189, 237, 248, 257, 475, 476, 482

[56] References Cited

U.S. PATENT DOCUMENTS

| | | |
|---|---|---|
| 3,258,477 | 6/1966 | Plueddemann et al. |
| 4,021,310 | 5/1977 | Shimizu et al. ............................... 203/8 |
| 4,385,153 | 5/1983 | Ritter ........................................ 524/522 |
| 4,455,205 | 6/1984 | Olson et al. .............................. 428/412 |
| 4,491,508 | 1/1985 | Olson ....................................... 428/412 |
| 4,528,324 | 7/1985 | Chung et al. ............................. 524/860 |
| 4,709,067 | 11/1987 | Chu et al. ................................. 556/440 |
| 5,242,719 | 9/1993 | Medford et al. ......................... 428/412 |
| 5,258,225 | 11/1993 | Katsamberis ............................. 428/412 |
| 5,271,968 | 12/1993 | Coyle et al. .............................. 428/412 |
| 5,312,871 | 5/1994 | Mardare et al. ......................... 526/265 |

OTHER PUBLICATIONS

U.S. patent application Ser. No. 08/304,299, filed Sep. 12, 1994.
E. G. Janzen, Spin Trapping, Chem. Eng. News 43,50 (Sep. 27, 1965), Amer. Chem. Soc. (pp. 31–40).
I. H. Leaver et al., E.S.R. of Nitroxide Radicals, Aust. J. Chem. 1969, (pp. 1891–1900).
J. C. Bevington and N. A. Ghanem, The Mechanisms of Inhibition and Retardation in Radical Polymerizations. Part III, The Use of a Stable Free Radical as an Inhibitor, J. of Polymer Science, 1956, (pp. 3506, 3507 and 3509).
R. C. Lamb et al., Organic Peroxides, III. The Behavior of Cyclohexaneformyl Peroxide in the Presence of Excess Stable Radicals. The Simultaneous Determination of Kinetics and Free Radical Efficiencies in the Thermal Decompositions of Free Radical Initiators, J. Phys. Chem. 1963, (pp. 914–917).
C. Anderson Evans, Spin Trapping, Aldrichimica Acta. vol. 12, No. 2, 1979 (pp. 23, 25, 26–29).
P. D. Bartlett, Galvinoxyl (2,6–Di–tert–butyl–a–(3, 5–di–tert–butyl–4–oxo–2, 5–cyclohexadiene–1–ylidene)–p–tolyloxy) As a Scavenger of Shorter–lived Free Radicals, J. Chem. Soc. 1962 (99.2596–2601).
J. F. Areizaga et al., Galvinoxyl As Scavenger in the Radical Polymerization of Styrene Initiated by AIBN, Makromol. Chem. Macromol. Symp. 20/21, 1988 (pp. 77, 79–82).
S. F. Nelsen, Azocumene. I. Preparation and Decomposition of Azocumene. Unsymmetrical Coupling Products of the Cumyl Radical, J. Am. Chem. Soc., 1965, (pp. 137–142).
L. N. Lewis et al., Ultraviolet–Curable, Abrasion–Resistant, and Weatherable Coatings with Improved Adhesion, J. of Applied Polymer Sicence, vol. 42, 1991, (pp. 1551–1556).
M. Stickler, Experimental Techniques in Free Radical Polymerization Kinetics, Makromol Chem. Macromol. Symp. Oct. 11, 1987, (pp. 17–69).

*Primary Examiner*—Mark Sweet
*Attorney, Agent, or Firm*—William H. Pittman

[57] ABSTRACT

There is provided a method and a composite made therefrom of an organic substrate, such as a polycarbonate and a radiation cured silicon containing polyacrylate hardcoat. Improved weathering resistance results when an anaerobic gelation inhibitor such as galvinoxyl is used during the processing of the hardcoat.

25 Claims, No Drawings

RADIATION CURABLE SILICON CONTAINING POLYARCYLATE HARDCOAT COMPOSITIONS, METHOD FOR MAKING, AND USE

REFERENCE TO RELATED APPLICATIONS

Reference is made to copending application Ser. Nos. 08/304,297 now U.S. Pat. No. 5,436,345, 08/304,298 and 08/304,299 filed concurrently herewith, and copending application Ser. No. 08/281,315.

BACKGROUND OF THE INVENTION

The present invention relates to radiation curable silicon containing polyacrylate hardcoat compositions, method for making, and composites made therefrom. More particularly, the present invention relates to the employment of an anaerobic gelation inhibitor during the devolatilizing of organic solvent from a silicon containing polyacrylate hardcoat mixture to produce a hardcoat composition and the radiation cure of the devolatized product on an organic substrate.

As shown by Chung, U.S. Pat. No. 4,478,876, a process is provided for applying a curable silicon containing polyacrylate hardcoat composition onto a substrate, such as a thermoplastic substrate. The cure of the Chung silicon hardcoat composition is effected in a non-inert atmosphere, such as air.

Chung further shows that a radiation curable silicon containing polyacrylate hardcoat composition, can be made by initially treating aqueous colloidal silica with an alkoxysilylacrylate, such as methylacryloxypropyltrimethoxysilane. Water is then removed from the mixture in the form of an aqueous/organic solvent azeotrope. Prior to devolatilizing, a polyfunctional reactive acrylic monomer, for example hexanedioldiacrylate, can be added to the mixture to provide an acrylic matrix for the silylated colloidal silica upon cure. As taught by Chung, application of the silicon containing polyacrylate hardcoat composition onto a solid substrate such as polycarbonate can provide a composite having improved abrasion resistance. Experience has shown however that premature gelation of reactive acrylic monomer can occur during the devolatilizing step unless unless an inhibitor is used. Accordingly, an inhibitor such as methylhydroquinone (MEHQ) is often employed with some degree of success. Although satisfactory silicon containing polyacrylate hardcoat composites can be made using prior art procedures employing MEHQ as an inhibitor, further improvments in radiation curable silicon containing polyacrylate hardcoat compositions are constantly being sought.

SUMMARY OF THE INVENTION

The present invention is based on the discovery that radiation curable silicon containing polyacrylate hardcoat composites having improved weatherability and abrasion resistance can be made by using an effective amount of an anaerobic gelation inhibitor, such as "galvinoxyl", having the formula,

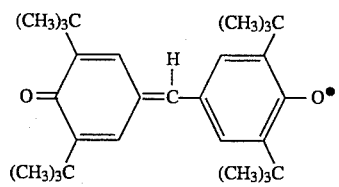

during the devolatilizing step in the formation of the silicon containing polyacrylate hardcoat composition.

As used hereinafter, the expression "radiation curable" means cure resulting from actinic radiation such as UV light, or particle radiation such as electron beam.

STATEMENT OF THE INVENTION

There is provided by the present invention, a method for making a composite exhibiting improved weathering resistance comprising an organic substrate and a cured silicon containing polyacrylate hardcoat composition, which method comprises, (A) treating at least a portion of the surface of the organic substrate with a devolatilized radiation curable silicon containing polyacrylate hardcoat composition, and, (B) effecting the radiation cure of the devolatilized curable silicon containing polyacrylate hardcoat composition, where the radiation curable silicon containing polyacrylate hardcoat composition comprises the devolatized product of reaction of a mixture comprising by weight, (i) 100 parts of a water miscible organic solvent, (ii) 1 to about 75 parts of colloidal silica silylated with alkoxysilylacrylate, (iii) 10 to about 400 parts of reactive polyacrylic monomer, and (iv) an effective amount of anaerobic gelation inhibitor.

In a further aspect of the present invention, there is provided a radiation curable silicon containing polyacrylate hardcoat composition, which comprises the devolatized product of reaction of a mixture comprising by weight, (v) 100 parts of a water miscible organic solvent, (vi) 1 to about 75 parts of colloidal silica silylated with alkoxysilylacrylate, (vii) 10 to about 400 parts of reactive polyacrylic monomer, and (viii) an effective amount of anaerobic gelation inhibitor.

The preferred alkoxysilylacrylates, which can be used to make the radiation curable silicon containing polyacrylate hardcoat composition are included within the formula,

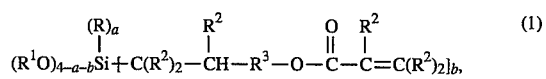

where R is a $C_{(1-13)}$ monovalent radical, $R^1$ is a $C_{(1-8)}$ alkyl radical, $R^2$ is selected from hydrogen, R radicals, or a mixture thereof, $R^3$ is a divalent $C_{(1-3)}$ alkylene radical, a is a whole number equal to 0 to 2 inclusive, b is an integer equal to 1–3 inclusive, and the sum of a+b is equal 1 to 3 inclusive.

There are included among the reactive polyfunctional acrylic monomers compounds having the formula,

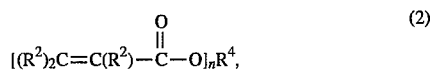

where $R^2$ is as previouly defined, and $R^4$ is a polyvalent organic radical, and n is an integer having a value of 2 to 4 inclusive.

R of formula (1) is more particularly selected from $C_{(1-8)}$ alkyl, such as methyl, ethyl, propyl, butyl, etc.; aryl radicals and halogenated aryl radicals, for example, phenyl, tolyl, xylyl, naphthyl, chlorophenyl, etc.; radicals included within $R^1$ are, for example, all of the $C_{(1-8)}$ alkyl radicals included within R; radicals included within $R^2$ are hydrogen and the same or different radicals included within R. Divalent alkylene radicals included within $R^3$ are, for example, methylene, ethylene, trimethylene, tetramethylene, etc. Divalent organic radicals included within $R^3$ and $R^4$ are branched $C_{(3-8)}$ alkylene radicals, branched halogenated $C_{(3-8)}$ alkylene radicals, branched hydroxylated $C_{(3-8)}$ alkylene radicals, branched acrylate radicals, $C_{(6-13)}$ arylene radicals, for example, phenylene, tolylene, naphthylene, etc., halogenated $C_{(6-13)}$ arylene radicals, etc.

In an additional aspect of the present invention, there is provided a composite exhibiting improved weathering resistance, comprising (C) an organic substrate having at least a portion of its surface treated with (D) a radiation cured silicon containing polyacrylate hardcoat composition, which is the product of reaction of a devolatized mixture comprising by weight, (vi) 100 parts of a water miscible organic solvent, (vii) 1 to about 75 parts of a reaction product of colloidal silica silylated with alkoxysilylacrylate, (viii) 10 to about 400 parts of reactive polyacrylic monomer, and (ix) 0.01 to about 0.5 part of an anaerobic gelation inhibitor.

Among the anaerobic gelation inhibitors which can be used in the practice of the invention there are galvinoxyl. Additional anaerobic gelation inhibitors are 2,2,6,6-tetramethylpiperidinyloxy (TEMPO) having the formula,

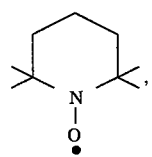

4-hydroxy(2,2,6,6-tetramethylpiperidinyloxy (4-OH TEMPO) having the formula,

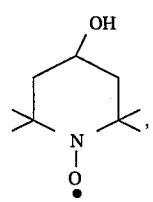

bis(4-hydroxy-tetramethylpiperidinyloxy) sebacate diradical, 2,2-diphenyl-1-picrylhydrazyl(DPPH), having the formula,

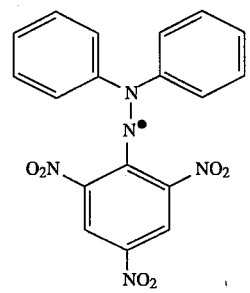

Banfield's Radical having the formula,

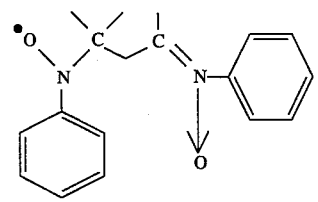

1,3,5-triphenyl verdazyl having the formula,

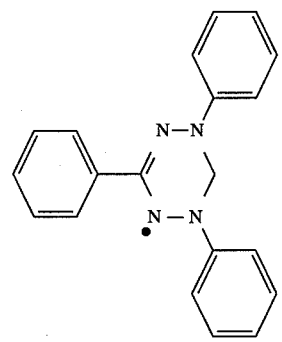

Koelsch's radical having the formula,

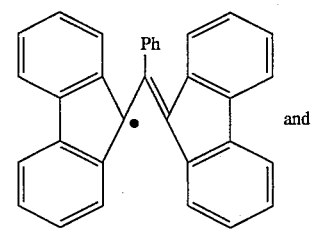

1-nitroso-2-naphthol having the formula,

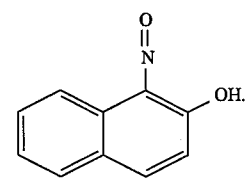

In addition, benzofuroxan, other nitroso compounds such as, nitrosobenzene and 2-methyl-2-nitroso propane dimer (Ntb), and nitrones, such as N-t-butyl-α-phenylnitrone can be used.

An effective amount of anaerobic gelation inhibitor is 100 ppm to 10,000 ppm based on the weight of reactive acrylic monomer used in the hardcoat composition.

Included within the silyl acrylates of formula (1), are compounds having the formulas, $CH_2=CCH_3CO_2-CH_2CH_2-Si(OCH_2CH_3)_3$,
$CH_2=CHCO_2-CH_2CH_2-Si(OCH_3)_3$,
$CH_2=CCH_3CO_2-CH_2CH_2-Si(OCH_3)_3$,
$CH_2=CHCO_2-CH_2CH_2-Si(OCH_2CH_3)_3$,
$CH_2=CCH_3CO_2-CH_2CH_2CH_2-Si(OCH_3)_3$,
$CH_2=CHCO_2-CH_2CH_2CH_2-Si(OCH_3)_3$,
$CH_2=CCH_3CO_2-CH_2CH_2CH_2-Si(OCH_2CH_3)_3$,
$CH_2=CHCO_2-CH_2CH_2CH_2-Si(OCH_2CH_3)_3$,
$CH_2=CCH_3CO_2-CH_2CH_2CH_2CH_2-Si(OCH_3)_3$,
$CH_2=CHCO_2-CH_2CH_2CH_2CH_2-Si(OCH_3)_3$,
$CH_2=CCH_3CO_2-CH_2CH_2CH_2CH_2-Si(OCH_2CH_3)_3$,
$CH_2=CHCO_2-CH_2CH_2CH_2CH_2-Si(OCH_2CH_3)_3$,
$CH_2=CHCO_2-CH_2CH_2CH_2CH_2-Si(OCH_3)_2CH_3$,
$CH_2=CHCO_2-CH_2CH_2CH_2CH_2-Si(CH_3)_2OCH_3$, etc.

Reactive polyfunctional acrylate monomers included within formual (2) are, for example diacrylates of the formulas,

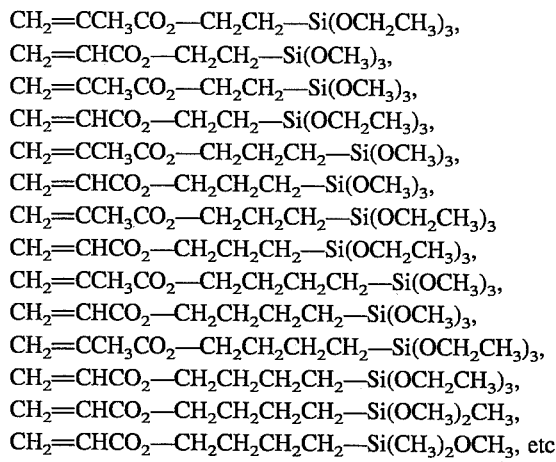

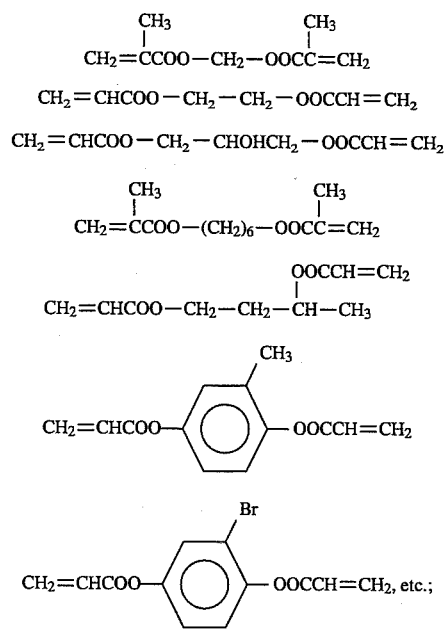

triacrylates of the formulas,

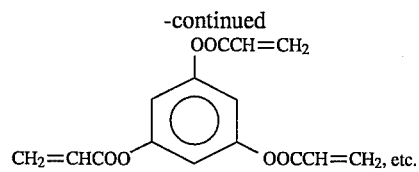

Tetraacrylate of the formulas,

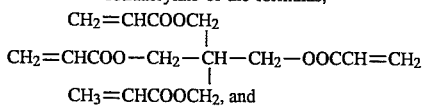

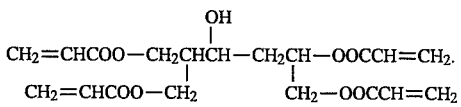

The colloidal silica used in the radiation curable silicon containing polyacrylate hardcoat composition or "hardcoat composition" employed in the practice of the present invention can be a dispersion of submicron-sized silica ($SiO_2$) particles in an aqueous or other solvent medium. Dispersions of colloidal silica are available from chemical manufacturers such as DuPont and Nalco Chemical Company. Colloidal silica is available in either acidic or basic form. It has been found that superior hardcoat properties can be achieved with acidic colloidal silica (i.e. dispersions with low sodium content). Alkaline colloidal silica also may be converted to acidic colloidal silica with additions of acids such as HCl or $H_2SO_4$ along with high agitation.

An example of a colloidal silica is Nalcoag 1034A, available from Nalco Chemical Company, Chicago, Ill. Nalcoag 1034A is a high purity acidic pH aqueous colloidal silica dispersion having a low $Na_2O$ content, a pH of approximately 3.1 and an $SiO_2$ content of approximately 34 percent by weight. A further example of colloidal silica is available from Nissan Chemical Co. which has 30% $SiO_2$ in isopropanol. An additional example is a Nissan Chemical Co. colloidal silica in methanol. However, experience has shown that gelation may occur unless the methanol mixture is used in combination with a branched alcohol, such as isopropanol to form a mixture having at least 20% by weight of branched alcohol. In instances where colloidal silica is used in an alcohol, in place of an aqueous system, it has been further found that at least sufficient water should be present to allow for alkoxysilylacrylate hydrolysis and preferably about 0.5 to about 5% by weight of the alcoholic silica dispersion.

The hardcoat compositions can contain a single polyfunctional acrylate monomer, or a mixture of two polyfunctional monomers, such as a diacrylate and a triacrylate. In addition, minor amounts of mono-acrylate can be used in particular instances. Further, the hardcoat composition can contain non-acrylic radiation curable aliphatically unsaturated organic monomers in amounts up to 50% by weight of the radiation curable hardcoat compositions which include, for example, such materials as N-vinyl pyrrolidone, styrene, etc.

When the hardcoat composition contains a mixture of acrylate monomers, it is preferred that the ratio, by weight, of the diacrylate to the triacrylate be from about 10/90 to about 90/10. Exemplary mixtures of diacrylate and triacrylates include mixtures of hexanediol diacrylate with pentaerythritol triacrylate, hexanediol diacrylate and trimethylolpropane triacrylate, diethyleneglycole diacrylate with pentaerythritol triacrylate, and diethyleneglycol diacrylate with trimethylolpropane triacrylate.

Preferably, the hardcoat composition used in the practice of the present invention is UV curable. Accordingly, it can contain a photosensitizing amount of photoinitiator, i.e., an amount effective to effect the photocure in a non-oxidizing atmosphere, for example, nitrogen. Generally, this amount is from about 0.01% to about 10% by weight, and preferably from about 0.1% to about 7% by weight of the photocurable hardcoat composition.

Ketone-type photoinitiators which preferably are used in a nonoxidizing atmosphere, such as nitrogen, are those selected from the group consisting of:
benzophenone,
acetophenone,
benzil,
benzaldehyde,
o-chlorobenzene,
xanthone,
thioxanthone,
2-chlorothioxanthone,
9,10-phenanthrenenquinone,
9,10-anthraquinone,
methylbenzoin ether,
ethylbenzoin ether,
isopropyl benzoin ether,
α,α-diethoxyacetophenone,
α,α-dimethoxyacetoophenone,
methyl benzoyl formate,
1-phenyl-1,2-propanediol-2-o-benzoyl oxime, and,
α,α-dimethoxy-α-phenylacetopheone.

The hardcoat composition used in the practice of the present invention also can contain UV absorbers or stabilizers such as resorcinol monobenzoate, 2-methylresorcinol dibenzoate, etc. The stabilizers can be present in an amount, based upon the weight of the coating composition, exclusive of any additional solvent which may optionally be present, of from about 0.1 to 15 weight percent, preferable from about 3 to about 15 weight percent. The UV cured hardcoat composition also can contain from about 1 to about 15% by weight of stabilizers based on the weight of UV curable hardcoat composition.

The hardcoat composition used in the practice of the present invention also can contain various flatting agents, surface active agents, thixotropic agents, UV light stabilizers and dyes.

Among surface-active agents, which also can be present, there are included anionic, cationic and nonionic materials. These materials are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference.

In the practice of one form of the present invention, the hardcoat composition can be made by initially blending together the aqueous colloidal silica, and the alkoxysilylacrylate. The polyfunctional acrylic monomer or mixtures thereof is preferably added to the resulting mixture. In one blending procedure, the alkoxylsilylacrylate can be hydrolyzed in the presence of aqueous colloidal silica and a water miscible organic solvent such as an an alcohol. In instances where a straight chain alcohol such as methanol has been used, and the acrylic monomer has been added, it is preferred to add a branched chain alcohol such as isopropanol to the straight chain alcohol prior to the devolatilizing of the mixture to minimize gelation.

Suitable water miscible organic solvents include alcohols such as methanol, ethanol, propanol, butanol, etc, or ether alcohols, such as ethoxyethanol, butoxyethanol, methoxypropanol, etc. In a further procedure, aqueous colloidal silica and the alkoxysilylacrylate are combined and stirred until hydrolysis has been effected. The hydrolysis of the alkoxylsilylacrylate can be accomplished at ambient conditions, or can be effected by heating the hydrolysis mixture to reflux for a few minutes.

Although the order of addition of the various ingredients in the hardcoat composition used in the practice of the present invention is not critical, it is preferred to add the polyfunctional acrylic monomer, or mixture thereof, to the above described mixture of hydrolyzed alkoxysilylacrylate and colloidal silica. Preferably, the polyfunctional acrylic monomer or mixtures thereof is added to the mixture of alkoxysilylacrylate and colloidal silica while it is stirring in a suitable hydrolysis medium, such as an aqueous solution of a water miscible alcohol as previously described.

In preparing the hardcoat composition used in the practice of the present invention, an azeotropic mixture of water and alcohol is distilled from the formulation. In instances where no alcohol is utilized in the initial hydrolysis mixture, sufficient alcohol can be added to facilitate the removal of water by distillation. Other solvents, for example, toluene, or other aromatic hydrocarbons, can be added to facilitate the removal of water. It has been found that at least one part of alkoxysilylacrylate per 10 parts of $SiO_2$ will provide effective results.

Suitable organic substrates which can be utilized in the practice of the present invention to produce shaped composites having enhanced abrasion and weathering resistance include both injection moldable thermoplastics which are preferred and substrates made from cross-linked organic polymers. Examples, of the thermoplastic organic polymers are Lexan polycarbonate, Valox polyester, Mylar polyester, Ultem polyetherimide, PPO polyphenyleneoxide, polymethylmethacrylate, high density polyethylene etc. In addition, wood and metal substrates such as steel, aluminum, metallized-thermoplastics, etc. also are contemplated in particular situations.

In order that those skilled in the art will be better able to practice the invention, the following examples are given by way of illustration and not by way of limitation. All parts are by weight.

EXAMPLE 1

A mixture of 2250 g of isopropanol, 70 g of methylacryloxypropyltrimethoxysilane, 468.3 g of Nalco 1034A (34% by weight pH 3 colloidal silica) and 0.2 g of galvinoxyl was heated at reflux for 1.5–2 hrs and the bath temperature did not exceed 100. Based on method of preparation, there was obtained colloidal silica silylated with methylacryloxypropyltrimethoxysilane. Then, 195.3 g of hexanedioldiacrylate was added followed by stirring for about .5 minutes. An isopropanol/$H_2O$ azeotrope was removed by vacuum distillation, with pressure maintained about 70 mm and a bath temperature of ca. 60° C. During the devolatilizing procedure, a constant flow of air from the gas inlet was maintained. There was obtained 403 g of a free flowing yellow liquid.

Coating formulations were prepared by adding 7 phr of a UV screen "BSEX" (2-(2H-benzotriazole-2-yl)-4-t-octylphenyl benzene sulfate) and 2 phr of a hydroxybenzophenone (Darocure 1664 photoinitiator of E Merk Co.). The coating formulations contained either MEHQ or galvinoxyl as an inhibitor. A third formulation with 100 ppm galvinoxyl was prepared by adding 40 mg in place of 0.2 g inhibitor. Fifteen mil polycarbonate films were coated on a cold cast line. A typical cold casting procedure is shown by D. J.

Coyle et al. U.S. Pat. No. 5,271,968. In the present example, a nip pressure of 15 psi, cure speed of 50 feet/min, roll temperature of 105° F., and a rubber roll durometer of 55 was used. The samples were then post cured in a PPG processor at 50 feet/min in air using two 10 inch medium pressure mercury 300 watt/inch lamps.

Coatings were prepared as above except that the level of BSEX was increased to 10 phr and the cure was accomplished on the cold cast line at a nip pressure of 20 psi, cure speed of 40 feet/min and roll temperature of 108° F. Coatings were inhibited with either 500 ppm MEHQ or 100 ppm galvinoxyl. These coatings employed 2 phr Darocure 1664 photoinitiator or 2 phr diethoxyacetophenone (DEAP) photoiniator. The following results were obtained, where Abrasion Resistance was measured after 500 Taber abrasion cycles, QUV photo aging was conducted using a cycle of 8 hours at 70° C. irradiation under UVB lights dry and 4 hours at 50° C. dark:

| Inhibitor (Ppr) | Initiator | Abrasion Resistance | QUV (1200 Hours) Δ% Haze | ΔYI |
|---|---|---|---|---|
| MEHQ (500) | 1664 | 7.1 | 5.4 | 2.4 |
| galvinoxyl (100) | 1664 | 6.5 | 4.6 | 2.0 |
| galvinoxyl (500) | 1664 | 7.3 | 2.6 | 3.0 |
| MEHQ (500) | DEAP | 7.9 | 9.7 | 7.8 |
| galvinoxyl (100) | DEAP | 6.8 | 5.5 | 5.7 |
| MEHQ (500) | 1664 | 6.8 | 3.1 | 7.3 |
| galvinoxyl (100) | 1664 | 6.5 | 2.8 | 5.4 |

The above table shows that an anaerobic gelation inhibitor, such as galvinoxyl can be used to impart improved weathering resistance to a composite of a polycarbonate substrate and a UV cured silicon containing polyacrylate hardcoat composition within the scope of the present invention.

Although the above example is directed to only a few of the many variables which can be used in the practice of the present invention, the actual scope of the present invention can be more fully appreciated by reference to the specification preceding the example.

What is claimed is:

1. A method for making a composite comprising (A) an organic substrate and (B) a cured silicon containing polyacrylate hardcoat composition, which method comprises, (i) treating at least a portion of the surface of the organic substrate with a devolatilized radiation curable silicon containing polyacrylate hardcoat composition, and, (ii) effecting the radiation cure of the devolatilized curable silicon containing polyacrylate hardcoat composition, where the radiation curable silicon containing polyacrylate hardcoat composition comprises the devolatilized product of reaction at a temperature of about 25° C. to 100° C. of a mixture comprising by weight, (iii) 100 parts of a water miscible solvent;

(iv) about 75 parts of silylated colloidal silica silylated with alkoxysilylacrylate, (v) 10 to about 400 parts of a reactive polyfunctional acrylic monomer, and (vi) an effective amount of anaerobic gelation inhibitor selected from the group consisting of 2,2,6,6-tetramethylpiperidinyloxy, 4-hydroxy-2,2,6,6-tetramethylpiperidinyloxy, bis(4-hydroxy-2,2,6,6-tetramethylpiperidinyloxy sebacate diradical, 2,2-diphenyl-1-picrylhydrazyl, 1,3,5-triphenylverdazyl, 1-nitroso-2-naphthol, a nitrone,

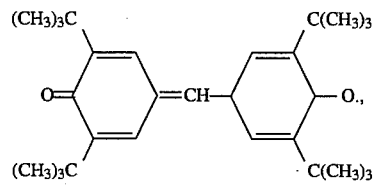

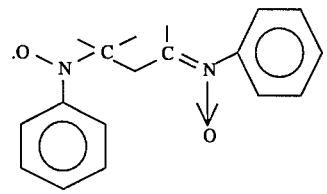

and

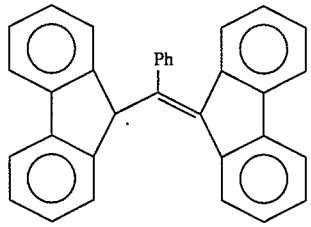

2. A method in accordance with claim 1, where the organic substrate is a polycarbonate substrate.

3. A method in accordance with claim 1, where the colloidal silica is silylated with methylacryloxypropyltrimethoxysilane.

4. A method in accordance with claim 1, where the reactive polyfunctional acrylic monomer is hexanedioldiacrylate.

5. A method in accordance with claim 1, where the anaerobic gelation inhibitor is represented by the formula

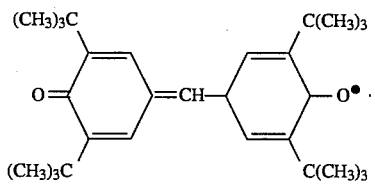

6. A method in accordance with claim 1, where the anaerobic gelation inhibitor is 4-hydroxy- 2,2,6,6-tetramethylpiperidinyloxy.

7. A method in accordance with claim 1, where the anaerobic gelation inhibitor is 2,2,6,6-tetramethylpiperidinyloxy.

8. A method in accordance with claim 1, where the anaerobic gelation inhibitor is 2,2-diphenyl-1-picryl-hydrazyl.

9. A method in accordance with claim 1, where the anaerobic gelation inhibitor is represented by the formula

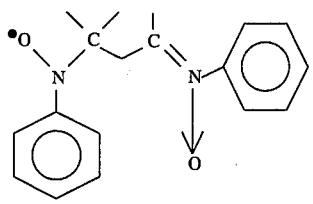

10. A method in accordance with claim 1, where the anaerobic gelation inhibitor is 1,3,5,-triphenyl verdazyl.

11. A method in accordance with claim 1, where the anaerobic gelation inhibitor is represented by the formula

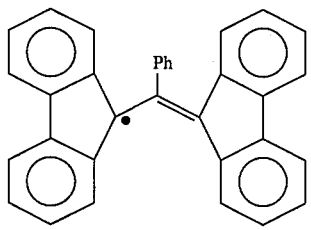

12. A method in accordance with claim 1, where the anaerobic gelation inhibitor is 1-nitroso-2-naphthol.

13. A method in accordance with claim 1, where the anaerobic gelation inhibitor is a nitrone.

14. A method in accordance with claim 1, where the anaerobic gelation inhibitor is bis(2,2,6,6-tetramethyl-4-piperidinyloxy) sebacate diradical.

15. A composite comprising (C) an organic substrate having at least a portion of its surface treated with (D) a radiation cured silicon containing polyacrylate hardcoat composition, which is the product of reaction of a devolatilized mixture comprising by weight, (vi) 100 parts of a water miscible organic solvent, (vii) 1 to about 75 parts of colloidal silica silylated with alkoxysilylacrylate, (viii) 10 to about 400 parts of reactive acrylic monomer, and (x) an effective amount of anaerobic gelation inhibitor selected from the group consisting of 2,2,6,6-tetramethylpiperidinyloxy, 4-hydroxy- 2,2,6,6-tetramethylpiperidinyloxy, bis(4-hydroxy-2,2,6,6-tetramethylpiperidinyloxy sebacate diradical, 2,2-diphenyl-1-picrylhydrazyl, 1,3,5-triphenylverdazyl, 1-nitroso-2-naphthol, a nitrone,

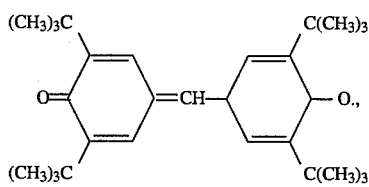

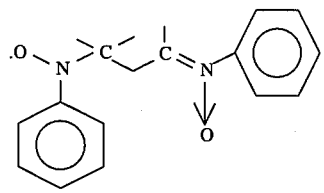

-continued
and

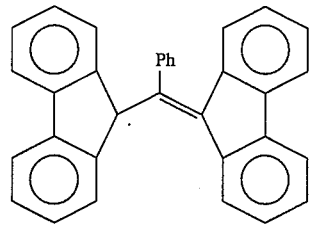

16. A composite in accordance with claim 15, where the anaerobic gelation inhibitor is represented by the formula

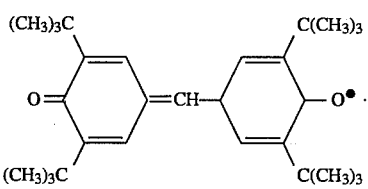

17. A composite in accordance with claim 15, where the anaerobic gelation inhibitor is 4-hydroxy-2,2,6,6-tetramethylpiperidinyloxy.

18. A composite in accordance with claim 15, where the anaerobic gelation inhibitor is 2,2,6,6-tetramethylpiperidinyloxy.

19. A composite in accordance with claim 15, where the anaerobic gelation inhibitor is 2,2-diphenyl-1-picryl-hydrazyl.

20. A composite in accordance with claim 15, where the anaerobic gelation inhibitor is represented by the formula

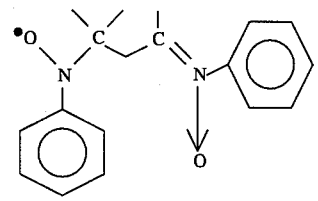

21. A composite in accordance with claim 15, where the anaerobic gelation inhibitor is 1,3,5,-triphenyl verdazyl.

22. A composite in accordance with claim 15, where the anaerobic gelation inhibitor is represented by the formula

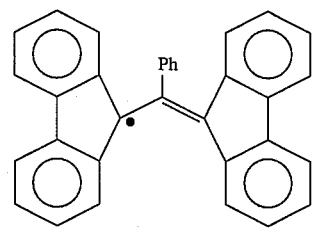

23. A composite in accordance with claim 15, where the anaerobic gelation inhibitor is 1-nitroso-2-naphthol.

24. A composite in accordance with claim 15, where the anaerobic gelation inhibitor is a nitrone.

25. A composite in accordance with claim 15, where the anaerobic gelation inhibitor is bis(2,2,6,6-tetramethyl-4-piperidinyloxy) sebacate diradical.

* * * * *

UNITED STATES PATENT AND TRADEMARK OFFICE
CERTIFICATE OF CORRECTION

PATENT NO. : 5,466,491

DATED : November 14, 1995

INVENTOR(S) : Arnold Factor, et al

It is certified that error appears in the above-identified patent and that said Letters Patent is hereby corrected as shown below:

Column 1 line 2 and Title page, [54]     "POLYARCYLATE" should read -- POLYACRYLATE --; column 2, line 17-18 should read --of shorter-lived free radicals, J. Am. Chem. Soc. 1962 (pp. 2596-2601).--

Signed and Sealed this

Ninth Day of April, 1996

Attest:

BRUCE LEHMAN

Attesting Officer     Commissioner of Patents and Trademarks